(12) United States Patent
Shafrir et al.

(10) Patent No.: US 9,712,592 B2
(45) Date of Patent: Jul. 18, 2017

(54) CLASSIFICATION OF HTTP MULTIMEDIA TRAFFIC PER SESSION

(75) Inventors: Alon Shafrir, Kfar Saba (IL); Amit Eshet, Tivon (IL); Jay Chambers, Huntsville, AR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 635 days.

(21) Appl. No.: 13/451,566

(22) Filed: Apr. 20, 2012

(65) Prior Publication Data

US 2012/0311121 A1 Dec. 6, 2012

Related U.S. Application Data

(60) Provisional application No. 61/477,617, filed on Apr. 21, 2011.

(51) Int. Cl.
*H04L 29/08* (2006.01)
*H04L 12/66* (2006.01)
*H04L 12/26* (2006.01)
*H04L 29/06* (2006.01)

(52) U.S. Cl.
CPC .............. *H04L 67/02* (2013.01); *H04L 12/66* (2013.01); *H04L 43/18* (2013.01); *H04L 67/146* (2013.01); *H04L 69/16* (2013.01); *H04L 69/22* (2013.01)

(58) Field of Classification Search
USPC .................................. 709/218–219, 227–229
See application file for complete search history.

(56) References Cited

U.S. PATENT DOCUMENTS

| 5,940,390 | A | * | 8/1999 | Berl et al. ...................... 370/389 |
| 6,073,175 | A | * | 6/2000 | Tavs et al. ..................... 709/226 |
| 7,032,072 | B1 | * | 4/2006 | Quinn et al. ................... 711/118 |
| 7,522,591 | B2 | * | 4/2009 | Kiyoto .................. H04L 67/322 370/389 |
| 7,522,627 | B2 | * | 4/2009 | Lam et al. ..................... 370/427 |
| 7,649,881 | B2 | * | 1/2010 | Casey .................. H04L 29/125 370/389 |
| 7,742,406 | B1 | * | 6/2010 | Muppala ............. H04L 41/5022 370/230 |
| 7,774,456 | B1 | * | 8/2010 | Lownsbrough ......... H04L 41/22 709/217 |
| 7,787,470 | B2 | * | 8/2010 | Rajagopalan ......... H04W 28/18 370/395.21 |
| 8,159,941 | B2 | * | 4/2012 | Dolganow .......... H04L 65/1016 370/230 |
| 8,239,468 | B2 | * | 8/2012 | Ikeda ...................... H04L 47/20 709/200 |

(Continued)

*Primary Examiner* — Shirley Zhang
(74) *Attorney, Agent, or Firm* — Stewart M. Weiner

(57) ABSTRACT

A non-transitory computer readable medium and a method for session based classification. The method may include detecting an initialization of a certain TCP connection; defining the certain TCP connection as an active TCP connection; receiving, by a classifier, an incoming packet that belongs to a session that involves conveying a media asset using a HTTP as an application layer protocol; determining, by the classifier, whether the incoming packet belongs to the certain active TCP connection or not; and if it is determined that the incoming packet belongs to the certain active TCP connection then classifying the incoming to a session that is associated with the certain active TCP connection based upon a mapping between sessions and active TCP connections.

17 Claims, 14 Drawing Sheets

(56) References Cited

U.S. PATENT DOCUMENTS

| | | | |
|---|---|---|---|
| 8,305,891 B2* | 11/2012 | Moonen | H04L 29/06027 370/230 |
| 2002/0091835 A1* | 7/2002 | Lentini et al. | 709/227 |
| 2003/0140140 A1* | 7/2003 | Lahtinen | H04L 12/2602 709/224 |
| 2006/0149845 A1* | 7/2006 | Malin | H04L 67/322 709/228 |
| 2007/0115825 A1* | 5/2007 | Roberts | H04L 41/5019 370/235 |
| 2007/0168466 A1* | 7/2007 | Tooley et al. | 709/218 |
| 2008/0077705 A1* | 3/2008 | Li | H04L 47/10 709/236 |
| 2009/0010259 A1* | 1/2009 | Sirotkin | H04L 47/10 370/392 |
| 2012/0079101 A1* | 3/2012 | Muppala | H04L 47/2441 709/224 |

* cited by examiner

CLASSIFICATION OF HTTP MULTIMEDIA TRAFFIC PER SESSION

RELATED APPLICATIONS

This patent application is a NONPROVISIONAL OF and claims priority of U.S. provisional patent Ser. No. 61/477,617 and filing date Apr. 21, 2011 which is incorporated herein by reference.

BACKGROUND

In multimedia content delivery systems there is a need for network devices to measure and control traffic per session. This allows network operator to control and/or monitor service-level metrics per session basis and provide related guarantees to users. Unlike aggregated traffic control mechanisms (e.g. per application type), per-session metrics can have direct relations to user-experience.

There are some prior art methods for application or subscribed based classification—all inadequate for providing session based classification.

Some of these classification methods are listed below:
a. IP-address based classification. Differentiating between traffic going to different subscribers is straight-forward and well known: The traffic to/from subscriber S uses subscriber S public IP address being different per subscriber. In case the HTTP server used for a multimedia application is dedicated to delivery of this specific application, it is similarly easy to differentiate between traffic of this application and that of other applications—By identifying traffic to/from the IP address of that HTTP server, one easily classifies this traffic as belonging to the application concerned. In general IP-based classification of traffic uses source and/or destination IP addresses. This is a solution for the case where no differentiation is needed between traffic from the same server to the same subscriber.
b. Classification based on IP address and port number. An extension of the above known solution is to also classify by well known UDP or TCP port numbers. This is effective for differentiating between HTTP and non-HTTP traffic but is not helpful in our case.
c. Network-device added QoS tags. Known methods allow classification by network devices based on combination of the above with QoS tags (e.g. ToS/DSCP/IEEE 802.11Q). A network device typically adds these tags based on previous methods and possibly additional DPI mechanisms, allowing classification of specific applications, specific servers or specific media types but not of specific sessions.

FIG. 1 is an illustration of a prior art HTTP media delivery system. It includes an application server 10, an application manager 30, a first delivery network 20, a network device for measuring and controlling traffic per application or per subscriber 40 (that may include application/subscriber granularity classifier 42), second delivery network 52, subscriber gateway 60 that may provide access connection termination and hay have a NAT router, a subscriber private network 70 and multiple (such as two) client (subscriber) devices 80 and 82.

The application server 10 is connected to the application manager 30 and to the first delivery network 20. The first delivery network 20 and the application manager 30 are connected to the network device 40 for measuring and controlling traffic per application or per subscriber. The second delivery network 52 is connected to the network device 40 and to the subscriber gateway 60. The subscriber gateway 60 and the client device 80 and 82 are connected to the subscriber private network. The client devices 80 and 82 can execute various applications such as watching video on-line (device 80), or watching video on line while downloading video for later offline viewing (device 82).

Network device 40 that performs such classification may be referred to as a "classifier". We assume classifiers have a table of relevant traffic-types with characteristics by which the traffic of a specific application or a specific subscriber is identified (e.g. IP address) and that table updates when applications or subscribers are added or removed from the system.

While such prior art systems and methods are typically limited to classification by subscriber or by application-type, and in a system as described in FIG. 1, the traffic of two different sessions, both of application 1 in the same subscriber-network is bound to be treated the same. The problem at hand is to allow classification not per subscriber or per application but also per session.

A subscriber is typically assigned with a single public IP address. A dynamic, overloading, NAT (Network Address Translation) function, sometimes referred to as PAT (Port Address Translation) is typically used. This allows the subscriber to have a private network with multiple devices all sharing the same public-network-connection and the same public IP address. This also means that to nodes on the public network, the entire subscriber-private network looks like a single device having a single IP address, thus hiding the private network structure and multiplicity of devices.

SUMMARY

According to an embodiment of the invention there is provided a method for session based classification, the method may include detecting an initialization of a certain transmission communication protocol (TCP) connection; defining the certain TCP connection as an active TCP connection; receiving, by a classifier, an incoming packet that belongs to a session that involves conveying a media asset using a HyperText Transfer Protocol (HTTP) as an application layer protocol; determining, by the classifier, whether the incoming packet belongs to the certain active TCP connection or not; and if it is determined that the incoming packet belongs to the certain active TCP connection then classifying the incoming to a session that is associated with the certain active TCP connection based upon a mapping between sessions and active TCP connections.

The method may include determining, by the classifier, whether the incoming packet belongs to the certain active TCP connection, to another active TCP connection or not to any active TCP connection; if it is determined that the incoming packet belongs to the certain active TCP connection then classifying the incoming to a session that is associated with the certain active TCP connection based upon the mapping between sessions and active TCP connections; and if it is determined that the incoming packet belongs to the other active TCP connection then classifying the incoming packet to another session that is associated with the other active TCP connection, based upon the mapping between sessions and active TCP connections.

If it is determined that the incoming packet does not belong to any active TCP connection then the method may include delaying a classification of the incoming packet.

If it is determined that the incoming packet does not belong to any active TCP connection then the method may include tagging the incoming packet as belonging to an unclassified session.

The method may include generating or updating the mapping between sessions and active TCP connections.

The method may include estimating a mapping between the certain TCP connection and a certain session, if the mapping lacks a fully resolved mapping between the certain TCP connection and any session.

The method may include maintaining by a first circuit of the classifier a data structure indicative of active TCP connections and performing the classifying by a second circuit of the classifier.

The method may include generating the mapping between sessions and active TCP connections in response to HTTP attributes of an incoming packet and information about a user that is either a destination of the incoming packet or a source of the incoming packet.

The method may include generating the mapping based upon an estimation of likelihood of a mapping between each TCP connection and each session.

The method may include detecting an initialization of a certain TCP connection only in one direction out of upstream and downstream.

According to an embodiment of the invention a method for session based classification may be provided and may include receiving, by a classifier, a session identification message that is indicative of a certain session that is conveyed over a certain (transmission communication protocol) TCP connection, using a protocol family that comprises Internet Protocol (IP), TCP and HyperText Transfer Protocol (HTTP); and associating each incoming packet that is conveyed over the certain TCP connection as belonging to the certain session.

The session identification message may be generated by a user that is either a destination of the incoming packet or a source of the incoming packet.

The session identification message may be generated by a content preparation device that is coupled to an HTTP server that is either a destination of the incoming packet or a source of the incoming packet.

The session identification message may be embedded in a HTTP entity tag.

According to various embodiment of the invention a non-transitory computer readable medium may be provided and may store instructions for: detecting an initialization of a certain (transmission communication protocol) TCP connection; defining the certain TCP connection as an active TCP connection; receiving an incoming packet that belongs to a session that involves conveying a media asset using a HyperText Transfer Protocol (HTTP) as an application layer protocol; determining whether the incoming packet belongs to the certain active TCP connection or not; and if it is determined that the incoming packet belongs to the certain active TCP connection then classifying the incoming to a session that is associated with the certain active TCP connection based upon a mapping between sessions and active TCP connections.

The non-transitory computer readable medium may store instructions for determining whether the incoming packet belongs to the certain active TCP connection, to another active TCP connection or not to any active TCP connection; if it is determined that the incoming packet belongs to the certain active TCP connection then classifying the incoming to a session that is associated with the certain active TCP connection based upon the mapping between sessions and active TCP connections; and if it is determined that the incoming packet belongs to the other active TCP connection then classifying the incoming packet to another session that is associated with the other active TCP connection, based upon the mapping between sessions and active TCP connections.

The non-transitory computer readable medium may store instructions for delaying a classification of the incoming packet if it is determined that the incoming packet does not belong to any active TCP connection.

The non-transitory computer readable medium may store instructions for generating or updating the mapping between sessions and active TCP connections.

The non-transitory computer readable medium may store instructions for estimating a mapping between the certain TCP connection and a certain session, if the mapping lacks a fully resolved mapping between the certain TCP connection and any session.

According to an embodiment of the invention a non-transitory computer readable medium may be provided and may store instructions for receiving a session identification message that is indicative of a certain session that is conveyed over a certain (transmission communication protocol) TCP connection, using a protocol family that comprises Internet Protocol (IP), TCP and HyperText Transfer Protocol (HTTP); and associating each incoming packet that is conveyed over the certain TCP connection as belonging to the certain session.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
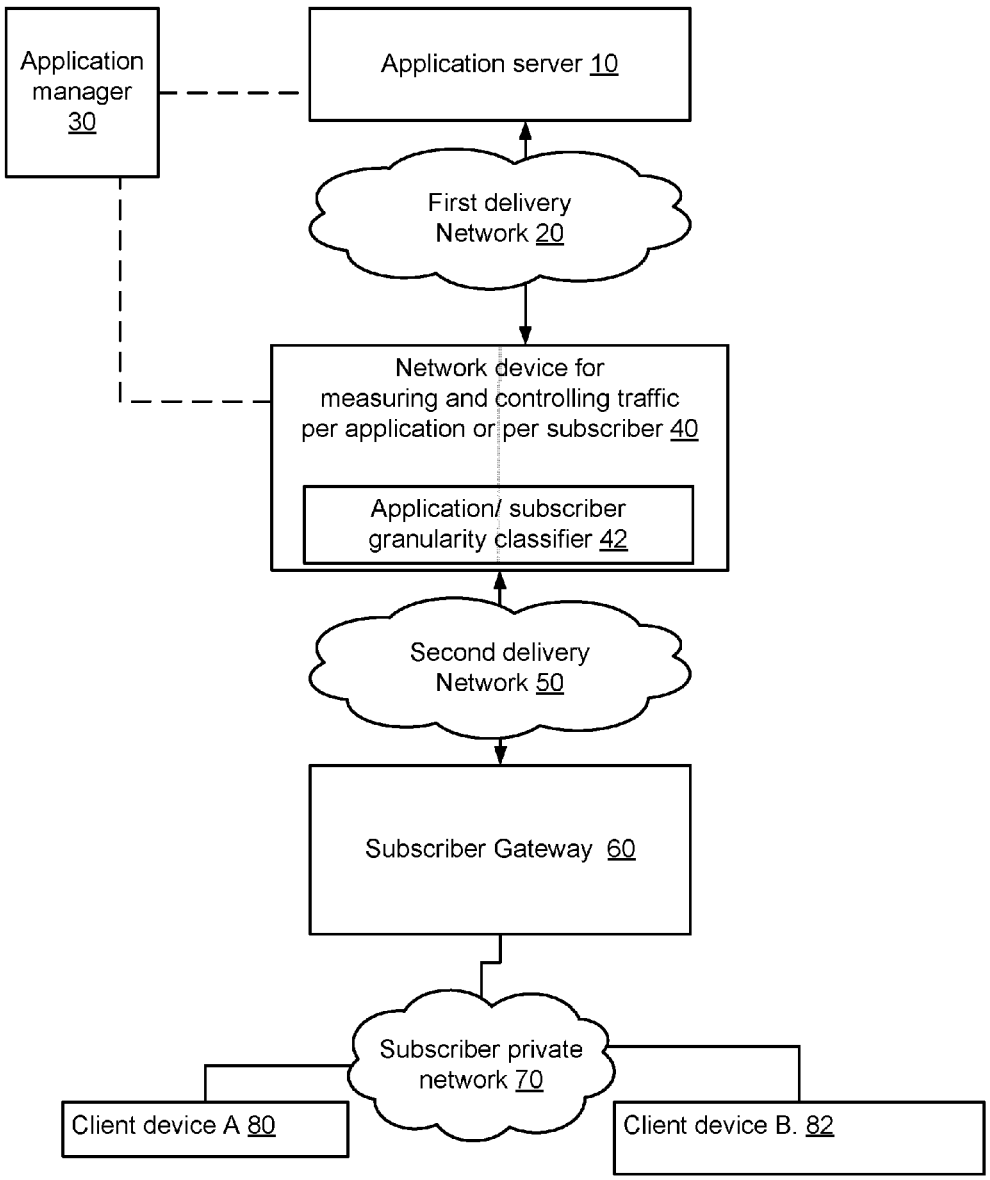
FIG. 1 illustrates a prior art system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A session may be defined as provision to a specific client a specific media-asset using a specific instance of a specific application and using the HTTP protocol. A media-asset may represent a pre-recorded piece of media content (examples may include a specific movie, episode, song, album, etc.) or a live media stream (such as a broadcast TV or radio channel or a live camera stream) or a concatenation of such content-pieces such that they are typically viewed continuously (e.g. a film spliced with advertisement clips). Media assets are encoded in known codec and container-formats (e.g. MPEG-2 video contained in an MPEG-Transport-Stream, XVID with mp3 in AVI or H-264 video in MP-4 file format)

There is provided a solution that may work even when the same subscriber has, at the same time, traffic for multiple applications going to multiple devices in his private network and even to multiple client-applications running on the same device by combining classification by application type with classification per subscriber.

Traffic control and measurement per session requires that the relevant network devices know which traffic belongs to which session. The problem dealt in this document is classification of media traffic to sessions by a network device, when delivery is over HTTP.

According to an embodiment of the invention classification can be made by using server added quality of service (QoS) tags. This may include embedding, by an HTTP server, QoS tags (e.g. DSCP) making things easier for the network devices. This also is typically limited to per-application or per-server classification but with cooperation of the HTTP server it is extendible to per-session classification by using tags with large enough scale (e.g. IEEE802.11Q) and introducing session-aware logic in the server which assign tags embedded for each session.

The invention provides solutions that work even when the same subscriber has, at the same time, traffic for multiple applications going to multiple devices in his private network and even to multiple client-applications running on the same device. The invention assumes that classifiers have a table of relevant sessions (sessions whose traffic needs to be classified) and that the table updates whenever sessions start or stop, possibly by signaling from a sessions-manager. Note that such classification of traffic to specific sessions immediately has the derived ability to also classify handled traffic by media-type or application type since each session includes to a specific application and media type.

There is also provided a variant of the above settings where a classifier (network device) only has access to the downstream traffic and a variant where classifier only has access to upstream traffic. In such variants, the classifier would only classify the traffic it has access to. In particular this matches a cable-network where access network equipment may consist of be separate devices for upstream and for downstream.

Another variability of the problem depends on the ability cooperation of other components, namely the client and/or server and/or subscriber-gateway and/or an asset-preparation component. Such cooperation implies that a component behaves in a proprietary manner for the purpose of classification. Ability to have cooperation of other components varies in different applications. There are provided solutions for a range of settings, from one where both client and server cooperate to ones where no other component (but the classifier) cooperates.

Following are various embodiments of the invention. Various methods are illustrated below. There is also provided any combination of said methods.

A common flow for traffic-classification may be used for all invented methods below and is given in FIG. 3.

Flow for monitoring part of the classifier is slightly different for each of the methods. A basic common flow and indication of variants is given in FIG. 6.

The following methods can:
a. Enable classification of traffic for specific media sessions.
b. Enable usage of network-protocols for such classification.
c. Enable usage application-level signaling for such classification.
d. Enable usage of media asset pre-processing for such classification.
e. Enable such classification by monitoring traffic, exploiting inherent continuities in media formats/content.
f. Enable such classification by a classifier that only has access to downstream traffic and/or by a classifier that only has access to upstream traffic.
g. Enable such classification when media content is encrypted.
h. Enable such classification while optimizing amount of processing and network-overhead.
i. Enable distributing the classification work between several network components to adapt to constraints of specific systems.
j. Enable classification of downstream traffic in cable access networks, when downstream—handling device has no access to upstream.

In some of the invented methods, the classifier work is split between components/devices hence allowing distribution of the classification work between multiple devices.

In particular, the classifier or any part of it may reside in the subscriber-gateway, the server or any network device between them.

Note that when an HTTP proxy is placed so it relays traffic between server and the gateway, it may play the role of the server in invented methods where server cooperation is needed.

Note also that when an HTTP proxy is placed so that it relays traffic between the gateway and the client, it may play role of the client in invented methods where client cooperation is needed. If such a proxy is on the public network, it simplifies the methods that use client-cooperation since there is no further need to add knowledge from another device to translate private addresses to public ones.

For sake of brevity, the term 'TCP-address' is used throughout this document to denote the IP-address and TCP-port-number used by one side of a TCP connection.

Figure 2:
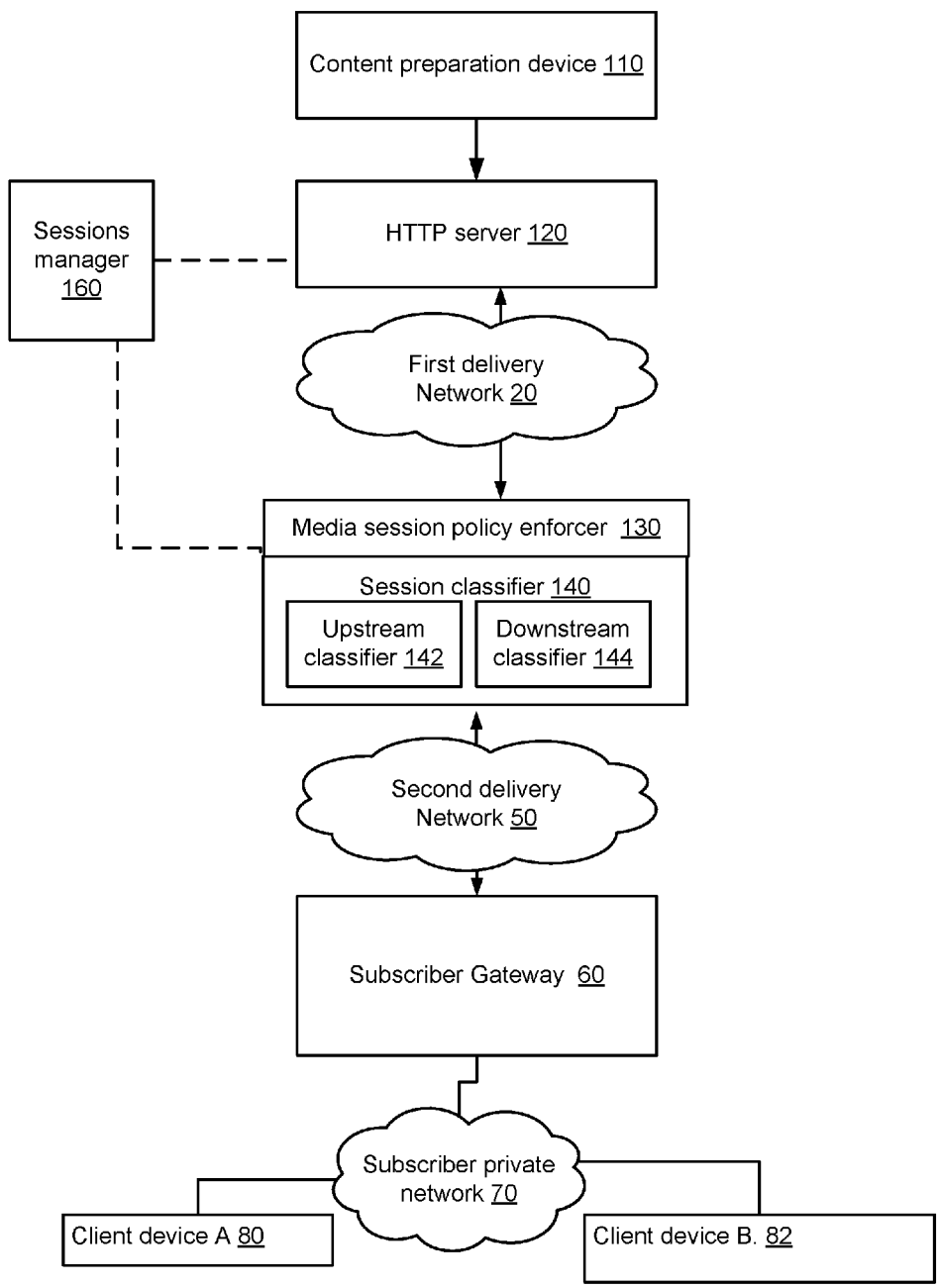
FIG. 2 illustrates a system according to an embodiment of the invention.

FIG. 2 illustrates a session classifier 140 and its environment according to an embodiment of the invention.

The environment includes a content preparation device 110, an HTTP server 120, a first delivery network 20, a sessions manager 160, a media session policy enforcer 130 for enforcing one or more policies on a session basis, a session classifier 140 for classifying traffic per session, second delivery network 52, subscriber gateway 60 that may provide access connection termination and hay have a NAT router, a subscriber private network 70 and multiple (such as two) client (subscriber) devices 80 and 82.

The session classifier 140 may include at least one out of an upstream classifier 142 and a downstream classifier 144, each allocated for classifying downstream or upstream traffic—respectively.

The content preparation device 110, the first delivery network 20 and the sessions manager 160 are connected to the HTTP server. The first delivery network 20 is also connected to the media session policy enforcer 130 and to the session classifier 140.

The media session policy enforcer 130 and the session classifier 140 are also connected to the second delivery network 52. The second delivery network 52 is also connected to the subscriber gateway 60. The subscriber gateway 60 and the client device 80 and 82 are connected to the subscriber private network.

Figure 10:
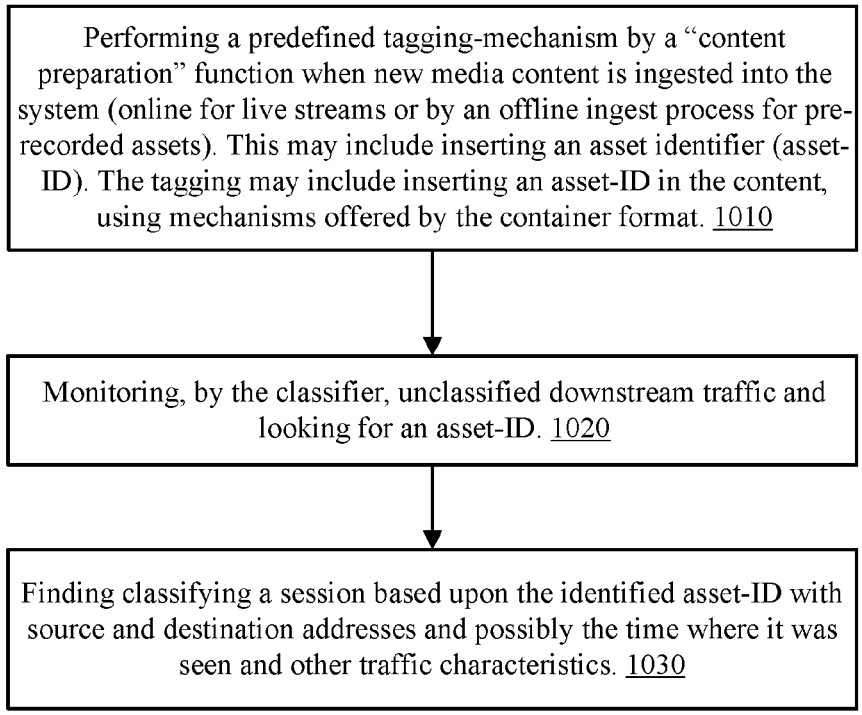
FIG. 10 illustrates a method according to an embodiment of the invention.
Figure 11:
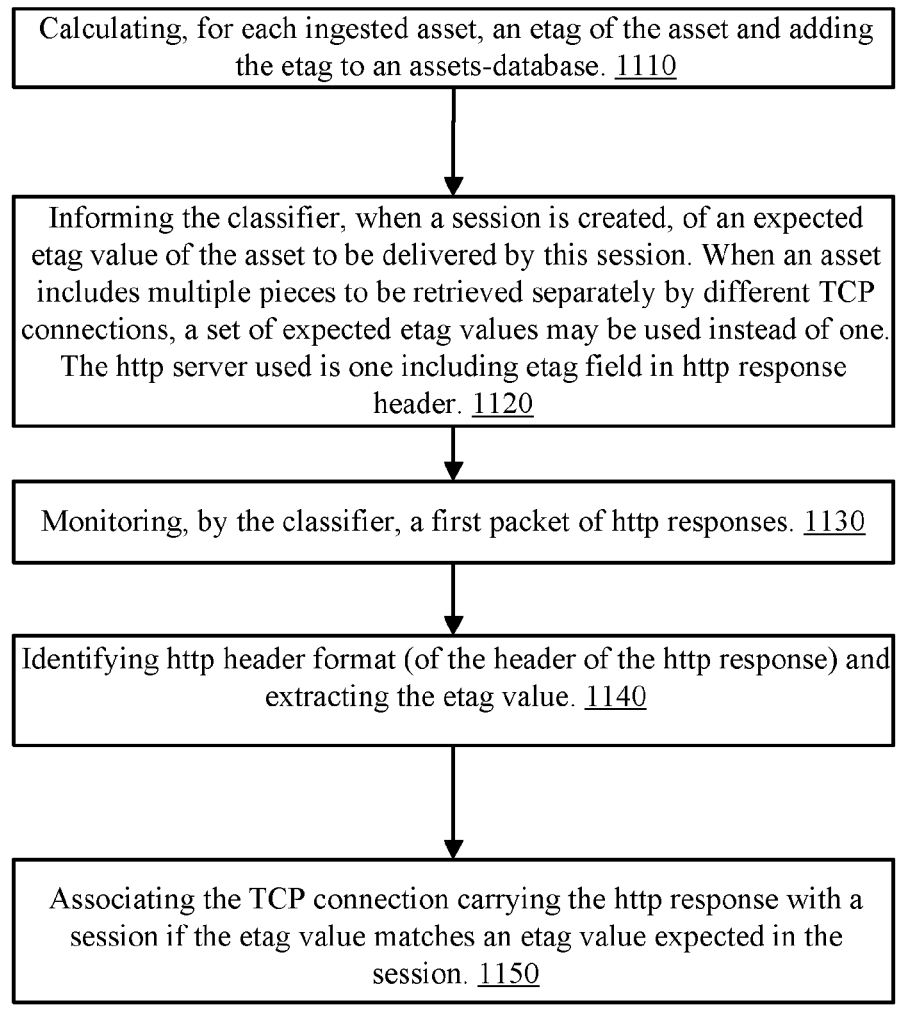
FIG. 11 illustrates a method according to an embodiment of the invention.

The content preparation unit 110 can be arranged to insert an asset-ID in a media container structure (as illustrated in FIG. 10 or 11).

Figure 9:
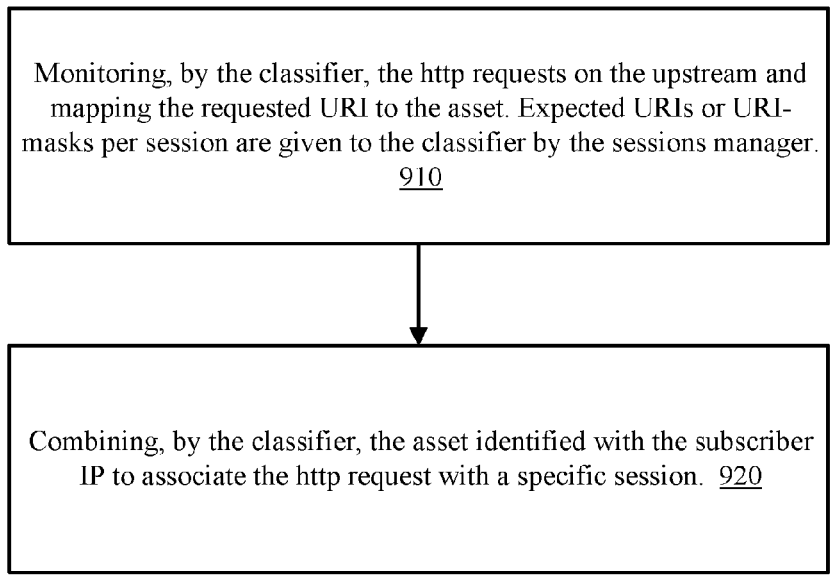
FIG. 9 illustrates a method according to an embodiment of the invention.

The HTTP server 120 may be arranged to send notifications or embedding session-id per new TCP connection (as illustrated in FIG. 9).

The sessions manager 160 may be arranged to coordinate parameters and distribute information to relevant devices.

The subscriber gateway may be arranged to perform all or part of monitoring or traffic classification, it may get or send notification messages per new TCP connection.

Each user device may send notification message per TCP connection and/or embed session-id in regular traffic per TCP connection (See, FIG. 9).

Figure 3:
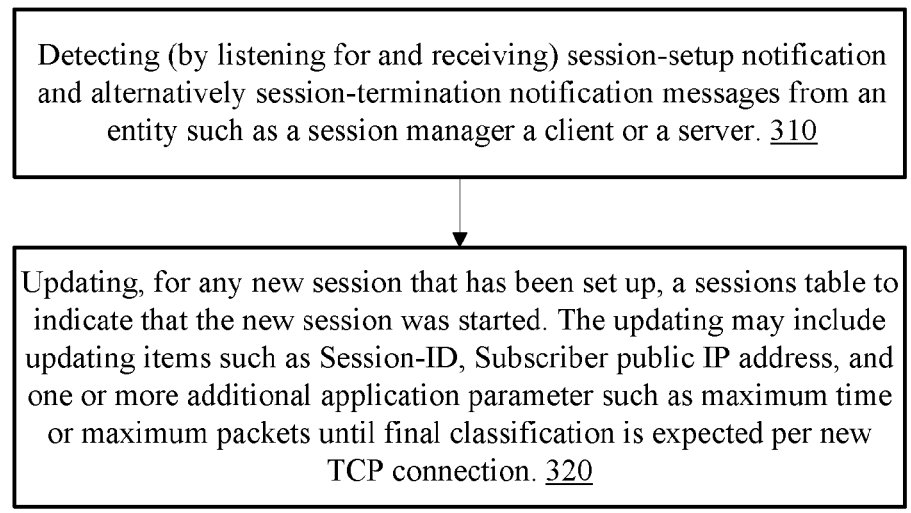
FIG. 3 illustrates a method according to an embodiment of the invention.

FIG. 3 illustrates method 300 according to an embodiment of the invention.

Method 300 starts by stage 310 of detecting (by listening for and receiving) session-setup notification and alternatively session-termination notification messages from an entity such as a session manager a client or a server.

Stage 310 may be followed by stage 320 of updating, for any new session that has been set up, a sessions table to indicate that the new session was started. The updating may include updating items such as Session-ID, Subscriber public IP address, and one or more additional application parameter such as maximum time or maximum packets until final classification is expected per new TCP connection.

Stage 320 may also include updating one or more fields such as Server IP address, Server port number, Set of asset URIs (method 900), or asset-IDs (methods 1000 or 1100) or etag values (method 1200) to be accessed in session, Session start time, additional client/asset/traffic characteristics mentioned in methods 1300 and 1400.

Stage 320 may also include updating, for terminated session notification, the sessions-table. This may include erasing or marking-inactive this session and all associated TCP connection rules.

Figure 4:
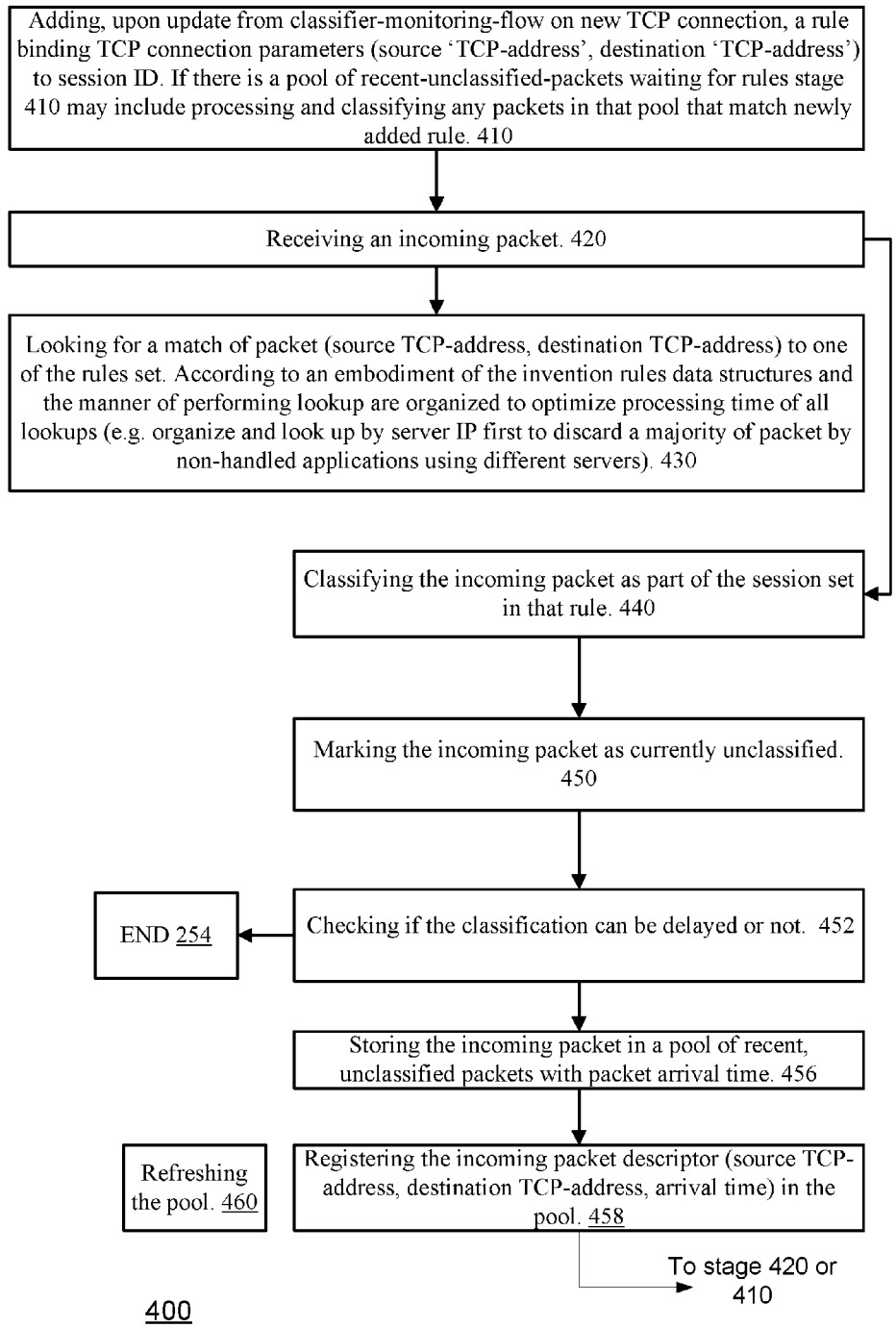
FIG. 4 illustrates a method according to an embodiment of the invention.

FIG. 4 illustrates method 400 for traffic-classification according to an embodiment of the invention.

Method 400 starts by stage 410 of adding, upon update from classifier-monitoring-flow on new TCP connection, a rule binding TCP connection parameters (source 'TCP-address', destination 'TCP-address') to session ID. If there is a pool of recent-unclassified-packets waiting for rules stage 410 may include processing and classifying any packets in that pool that match newly added rule.

Stage 410 may be followed by stage 420 of receiving an incoming packet.

Stage 420 may be followed by stage 430 of looking for a match of packet (source TCP-address, destination TCP-address) to one of the rules set. According to an embodiment of the invention rules data structures and the manner of performing lookup are organized to optimize processing time of all lookups (e.g. organize and look up by server IP first to discard a majority of packet by non-handled applications using different servers).

If a match is found stage 430 may be followed by stage 440 of classifying the incoming packet as part of the session set in that rule. Stage 440 may include updating last-activity time of TCP connection (for sake of identifying inactive connections). Stage 440 may include detecting the incoming packet as marking an end of TCP connection and setting timeout for setting connection and rule as inactive.

If a match is not found then stage 430 may be followed by stage 450 of marking the incoming packet as currently unclassified.

Stage 450 may be followed by stage 452 of checking if the classification can be delayed or not. If it is determined that the classification is relevant if done immediately, stage 452 may be followed by END stage 454 of finishing processing for this packet.

If the classification can be delayed-stage 452 may be followed by either one of stages 456 or 458. Stage 456 includes storing the incoming packet in a pool of recent, unclassified packets with packet arrival time. Stage 458 may be executed if the incoming packet should be passed as unclassified but registered for later retroactive classification. In this case stage 458 includes registering the incoming packet descriptor (source TCP-address, destination TCP-address, arrival time) in the pool.

Method 400 may also include stage 460 of refreshing the pool. This may include removing (for example periodically) from the pool packets/descriptors that are too old to be waiting any further. Alternatively, stage 460 may include using time-based mechanism (e.g. periodic polling) for finding TCP connections that are inactive beyond allowed period and mark them inactive/erase rule.

In some of the methods, the traffic-classification flow may receive some packets which belong to a session before receiving the update allowing it to associating those packets with the session. Depending on the application, the flow may either delay classification of such packets (for a reasonable time frame until update is expected) and/or treat them as unclassified for the meanwhile. If classification is done for monitoring only there is typically no problem delaying it. This is illustrated, for example, by method 400.

If however, delaying classification would delay arrival of the packet to its destination then the delay period should be limited. Moreover, when such an update (associating TCP connection with session) depends on some traffic flowing (e.g. until TCP connection setup is done), the packets up to that point shouldn't be delayed and should arrive their destination.

Figure 5:
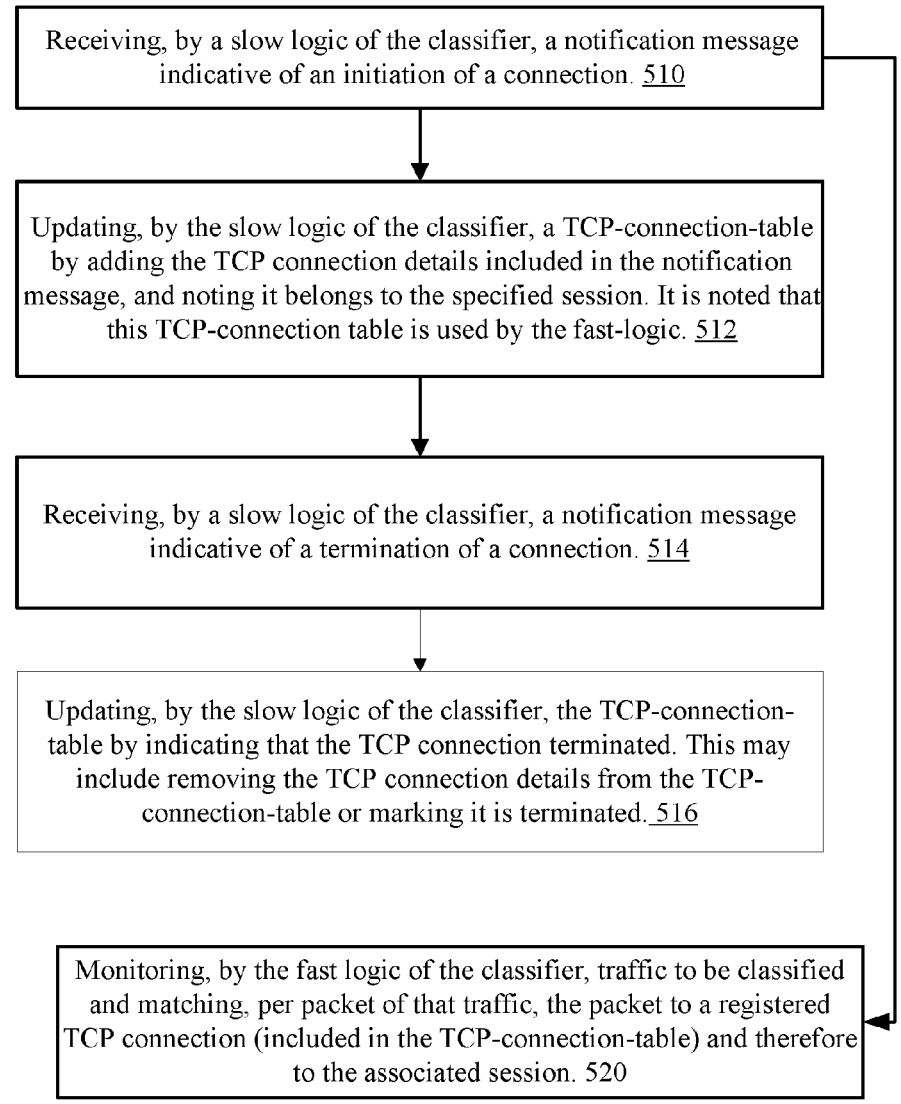
FIG. 5 illustrates a method according to an embodiment of the invention.

FIG. 5 illustrates method 500 according to an embodiment of the invention. Method 500 involves a server initiated control message per TCP connection.

In this embodiment the server participates in the classification process any may initiate a notification message informing the classifier (possibly through a sessions-manager) that a specific TCP-address is used for a specific session.

The server and classifier may have an agreed session ID to indicate a specific session. The session ID should be at least unique among sessions between that server and that subscriber so that when combined with other parameters known to the classifier there will be no ambiguity. To simplify things session ID can be globally unique or unique amongst sessions and traffic handled by the same classifier.

According to this embodiment of the invention the classifier logic may include (a) slow-logic (for performing work per TCP connection being setup or terminated) and (b) fast-logic for performing work per flowing packet.

Method 500 may start by stage 510 of receiving, by a slow logic of the classifier, a notification message indicative of an initiation of a connection. The notification message can include a session ID with the client and server TCP-addresses of that TCP connection. Some of these fields may already be included in network layers and do not need to be included again in the message payload (e.g. source IP address of server when server sends the message by IP packet to the classifier). Some of these fields may also be redundant for the purpose of avoiding ambiguity and therefore can be omitted (e.g. server TCP port when server always uses TCP port 80)

Stage 510 is followed by stage 512 of updating, by the slow logic of the classifier, a TCP-connection-table by adding the TCP connection details included in the notification message, and noting it belongs to the specified session. It is noted that this TCP-connection table is used by the fast-logic.

Stage 512 may be followed by stage 514 of receiving, by a slow logic of the classifier, a notification message indicative of a termination of a connection.

Stage 514 is followed by stage 516 of updating, by the slow logic of the classifier, the TCP-connection-table by indicating that the TCP connection terminated. This may include removing the TCP connection details from the TCP-connection-table or marking it is terminated.

Method 500 also include stage 520 of monitoring, by the fast logic of the classifier, traffic to be classified and matching, per packet of that traffic, the packet to a registered TCP connection (included in the TCP-connection-table) and therefore to the associated session. The traffic may be downstream traffic, upstream traffic or both (depending upon the accessibility of the classifier to these types of traffic).

According to an embodiment of the invention the slow-logic and fast-logic of the classifier may reside in different devices/components and instead of a shared TCP-connection-table, stage 512 may include updating a TCP-connection-table accessible to the fast-logic by sending messages to the messages are used to update TCP connections table when a TCP connection is set-up. The same applies to stage 516.

Note that in many typical cases, subscriber 'TCP-address' is sufficient to uniquely identify TCP connections and in such cases server address and port may be omitted.

In some applications, one TCP connection is opened at the beginning of the session and is used for all session traffic. In such cases, the classifier can be notified at the beginning of the session and use same classification rules (based on TCP-addresses) for the entire session.

Figure 6:
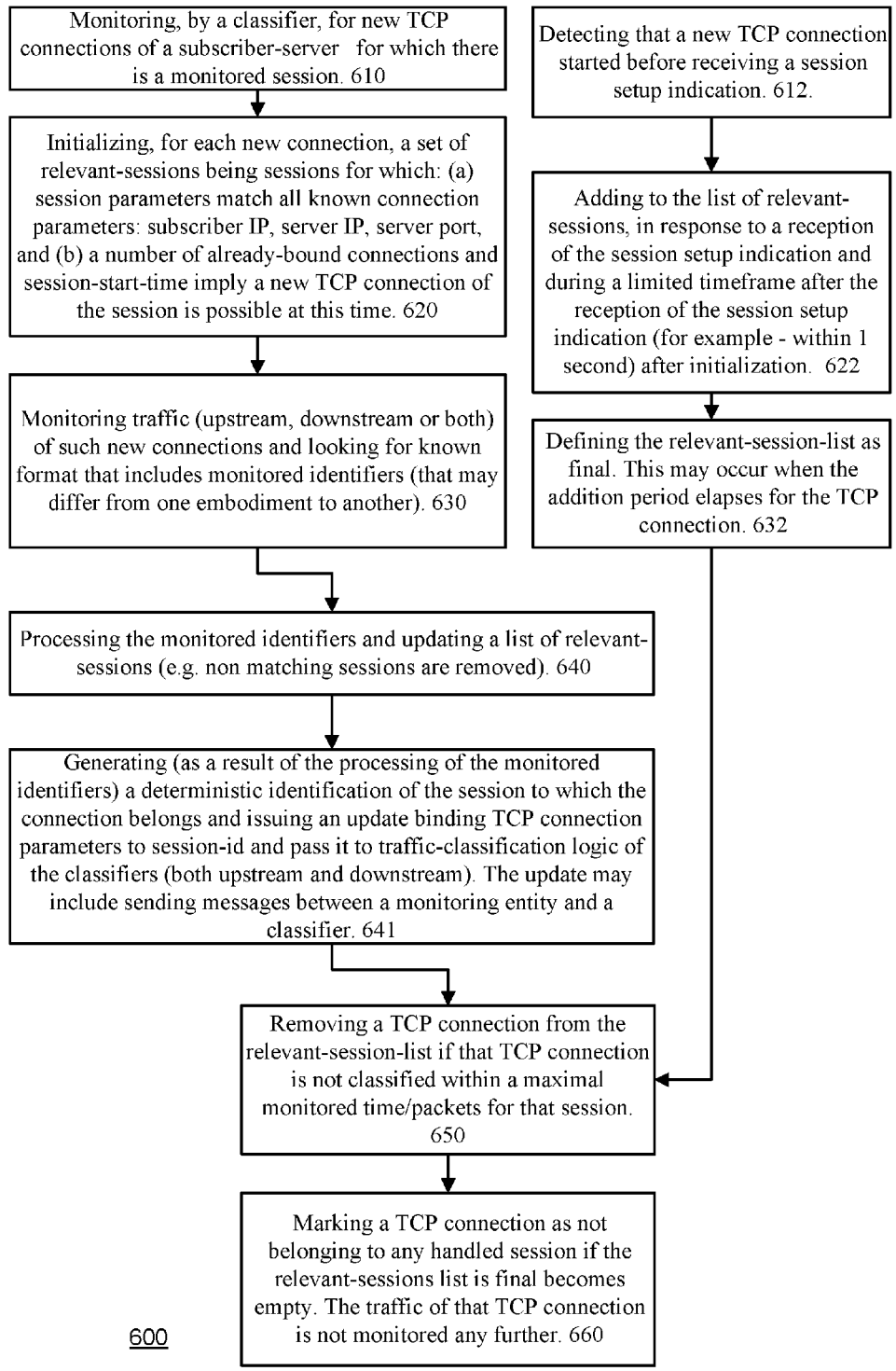
FIG. 6 illustrates a method according to an embodiment of the invention.

FIG. 6 illustrates method 600 according to an embodiment of the invention.

Method 600 may involve client initiated control message per TCP connection.

Method 600 resembles the previous method (500) but requires client cooperation instead or in addition to server cooperation. It may be useful in cases where having server cooperation with logic that is session-aware is impractical or harder to obtain than in the client.

Note that since the client device is behind a NAT router, it is actually not aware of the client-side TCP-address used on the public network and the public TCP-address is the one that the classifier would need to use.

This can be dealt with by (a) having both client and server cooperate, (b) exploiting NAT router mapping logic, and/or (c) Using subscriber-gateway cooperation.

Having both client and server cooperate—In cases where it is easier to have session awareness and/or awareness of TCP-connection-setup in the client, the client shall send a notification message to the server per new TCP connection and convey the relevant session ID. The server will add public-side TCP-address of the client (either one can provide server TCP-address) and server will then forward the notification message to the classifier (possibly through a manager) Exploiting NAT router mapping logic—the client sends a proprietary notification IP-packet to the classifier (possibly through a manager) with session ID and server TCP-address if needed. The client-device TCP-address need not be included but instead the client sends the message using the same source TCP port used by the client on the TCP connection to be associated. Note that the NAT router mapping from private side TCP-address to their corresponding public side TCP-address would typically not be affected by destination address or port; the NAT router therefore translates the notification packet source TCP-address to the same values used by the relevant TCP connection. The receiving device (the classifier or manager) sees the client side public TCP-address in the network layers of the notification packet and will use it. When notification is not sent directly to the classifier IP address, the receiving device (e.g. a Sessions Manager) shall add this IP-layer information into the message before relaying to the classifier. Using subscriber-gateway cooperation—client side public TCP-address can be added by a cooperating logic in the subscriber gateway. This involves proprietary logic in the subscriber-gateway which provides the public-values of subscriber TCP-address used for that connection. This can be done in one of a few ways:

a. When proprietary logic in the subscriber-gateway has access to both private-side and public-side of the NAT router or has access to the mapping tables used by the NAT router it can get/intercept message and replace client-device TCP-address with the corresponding public values before forwarding.

b. When proprietary logic in the subscriber-gateway monitors traffic on public-side of the NAT router. This logic is aware of sessions and can identify TCP-connection setup and to which session-ID this connection belongs (e.g. when only one session allowed per device and gateway also has access in private network addresses). In this case the cooperating logic in the subscriber-gateway can initiate the notification without need for client cooperation.

c. When proprietary logic in the subscriber gateway monitors traffic on public-side of the NAT router it can monitor new TCP connections setup messages and get/intercept notification messages. For each notification message it would add the public subscriber TCP-address of most recent TCP-connection that was set up between the subscriber private network and the relevant HTTP server.

FIG. 6 illustrates a general flow for monitoring for new TCP connections and binding them to sessions according to an embodiment of the invention. It is applicable for the Subscriber-gateway traffic monitoring mentioned above as well as of the following methods involving monitoring by classifiers.

Method 600 may start by stages 610 or 612.

Stage 610 may include monitoring, by a classifier, for new TCP connections of a subscriber-server for which there is a monitored session.

Stage 610 may be followed by stage 620 of initializing, for each new connection, a set of relevant-sessions being sessions for which: (a) session parameters match all known connection parameters: subscriber IP, server IP, server port, and (b) a number of already-bound connections and session-start-time imply a new TCP connection of the session is possible at this time.

Stage 620 may be followed by stage 630 of monitoring traffic (upstream, downstream or both) traffic of such new connections and looking for known format that includes monitored identifiers (that may differ from one embodiment to another).

Stage 630 may be followed by stage 640 of processing the monitored identifiers and updating a list of relevant-sessions (e.g. non matching sessions are removed). Stage 640 may include stage 641 of generating (as a result of the processing of the monitored identifiers) a deterministic identification of the session to which the connection belongs and issuing an update binding TCP connection parameters to session-id and pass it to traffic-classification logic of the classifiers (both upstream and downstream). The update may include sending messages between a monitoring entity and a classifier.

Stage 612 may include detecting that a new TCP connection started before receiving a session setup indication.

Stage 612 may be followed by stage 622 of adding to the list of relevant-sessions, in response to a reception of the session setup indication and during a limited timeframe after the reception of the session setup indication (for example—within 1 second) after initialization. Stage 622 may also include (a) defining the relevant-sessions-list as non-final and considering an association of connection to session as non-deterministic, wherein the association may be postponed until the relevant-session-list is final; (b) storing encountered identifier (or identifiers) for the connection to allow later processing of new sessions when notification arrives; (c) processing and/or updating existing relevant-sessions list (e.g. removing non matching sessions).

Stage 622 may be followed by stage 632 of defining the relevant-session-list as final. This may occur when the addition period elapses for the TCP connection.

Stages 640 and 632 may be followed by stage 650 of removing a TCP connection from the relevant-session-list if that TCP connection is not classified within a maximal monitored time/packets for that session.

Stage 650 may be followed by stage 660 of marking a TCP connection as not belonging to any handled session if the relevant-sessions list is final becomes empty. The traffic of that TCP connection is not monitored any further.

Figure 7:
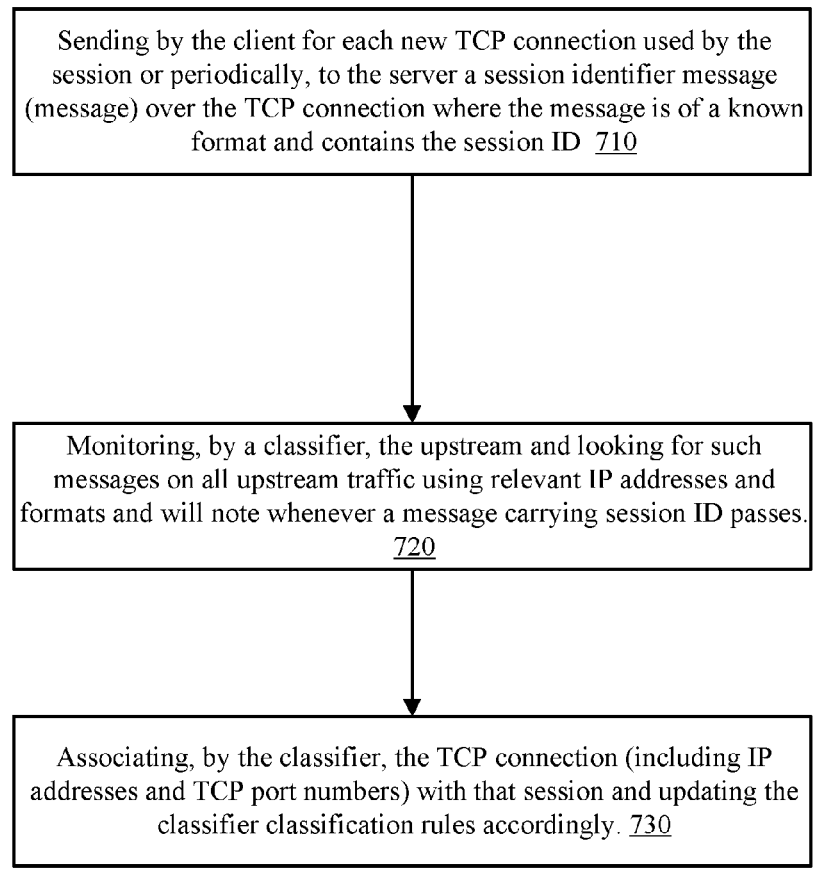
FIG. 7 illustrates a method according to an embodiment of the invention.

FIG. 7 illustrates method 700 according to an embodiment of the invention.

This method may involve server and/or client added in band-tags per TCP connection.

Another approach is to implicitly signal the used TCP connections to the classifier by embedding in band information which the classifier can monitor to associate each relevant TCP connection with a session ID.

Method 700 can start by stage 710 of sending by the client for each new TCP connection used by the session or periodically, to the server a session identifier message (message) over the TCP connection where the message is of a known format and contains the session ID Stage 710 may be followed by stage 720 of monitoring, by a classifier, the upstream and looking for such messages on all upstream traffic using relevant IP addresses and formats and will note whenever a message carrying session ID passes.

Stage 720 may be followed by stage 730 of associating, by the classifier, the TCP connection (including IP addresses and TCP port numbers) with that session and updating the classifier classification rules accordingly.

If correct classification is required for all packets, or all but a first few packets, stage 710 may including sending such messages in the first, or one of the first packets sent over each TCP connection.

For example, the session ID may be embedded in the HTTP request as a cookie. In this case, the monitored identifiers referred to in stage 620 of FIG. 6 may be a cookie in HTTP requests and stage 620 may include deriving the session-id and looking for a matching session.

A man skilled in the art may appreciate that embedding something in the HTTP request has the advantage of being easy for higher-level-applications which may not even be aware of the underlying TCP connections establishment and port numbers.

Moreover, this is also applicable without relying to client proprietary behavior: media applications typically use a centralized application server which directs clients to specific HTTP servers and such systems often use cookies to pass session parameters. By simply setting a cookie of session-id and binding it to a domain and path that are used throughout all traffic of this session, we get the desired behavior without relying to any proprietary client/server behavior except for standard setting of HTTP cookies in a centralized sever.

Method 700 may require the classifier to monitor the upstream. It should be noted that upstream traffic of discussed applications in out context is expected to be low. Note also that upstream monitoring is only critical for the purpose of identifying new TCP connections of handled multimedia sessions; in many applications, the rate of such new TCO connections per subscriber is expected to be very low.

It is noted that method 700 can be executed by a system where the monitoring of the upstream for session-messages is done on a separate device and in particular in the subscriber gateway. For the reasons above this incorporates little processing overhead on that device. In this variation, whenever such a message identified, it is communicated to the classifier including the "fast logic" by a message including the TCP connection details and session ID.

Figure 8:
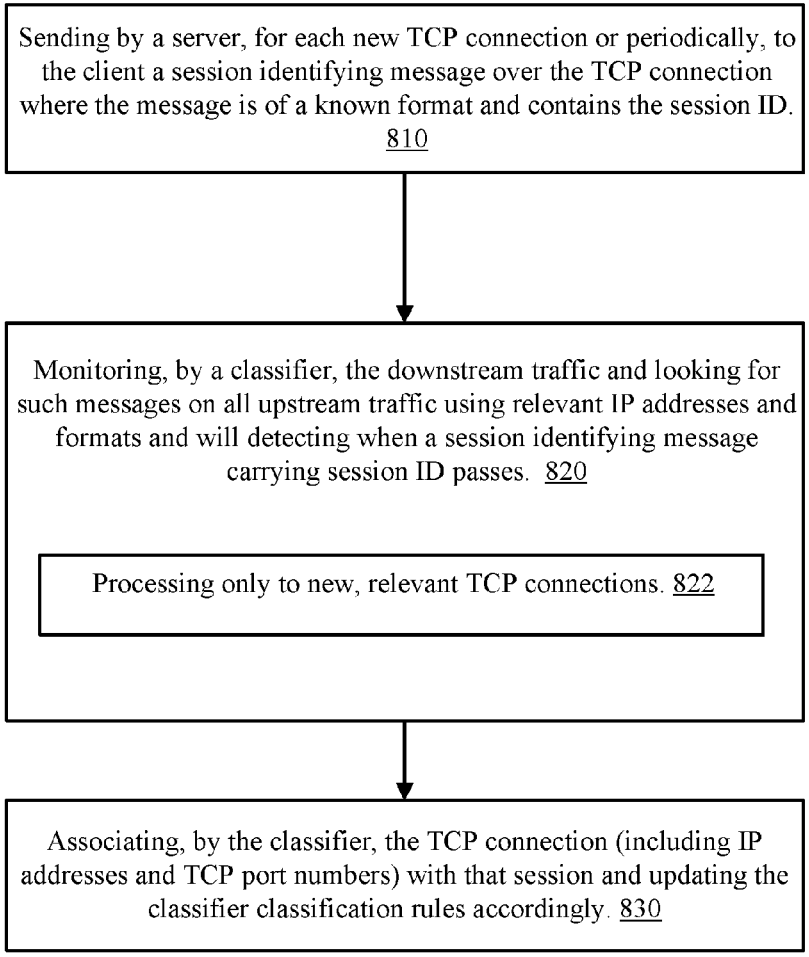
FIG. 8 illustrates a method according to an embodiment of the invention.

FIG. 8 illustrates method 800 according to an embodiment of the invention.

This method may involve server and/or client added in band-tags per TCP connection.

Method 800 may start by stage 810 of sending by a server, for each new TCP connection or periodically, to the client a session identifying message over the TCP connection where the message is of a known format and contains the session ID.

Stage 810 may be followed by stage 820 of monitoring, by a classifier, the downstream traffic and looking for such messages on all upstream traffic using relevant IP addresses and formats and will detecting when a session identifying message carrying session ID passes.

Stage 820 may be followed by stage 830 of associating, by the classifier, the TCP connection (including IP addresses and TCP port numbers) with that session and updating the classifier classification rules accordingly. If correct classification is required for all, or all but a few packets, this session identifying message should be sent in the first, or one of the first packets sent over each TCP connection.

This method may be applicable whenever the classifier can monitor the downstream traffic.

For example, the session ID may be embedded in the HTTP header of HTTP response as an HTTP-header-optional-field. This way it precedes any data retrieved in that TCP connection. In this case step (c) of the classifier-monitoring flow above would monitor HTTP-response headers looking for such a field and derive the session-id, looking for a matching session.

When embedding something in HTTP requests as in mechanism illustrated above is simpler than in server responses and when classifier can only monitor downstream, the following combination may be used—Client issues a triggering message to the server which triggers server response having well known format and includes the session ID (session identification message). Since this response would be sent over the same TCP connection, the client is actually the initiator but classifier can receive it from downstream traffic.

This also allows for a solution where the server is unaware of the session ID since the client message may also carry the session ID triggering a server response that includes it.

For example, client can send an HTTP TRACE request with session ID embedded in it, causing the server to reply echoing the request contents.

Note that to optimize the amount of processing needed for monitoring for inband-tags, the monitoring logic can limit processing only to new, relevant TCP connections. Thus, stage 820 may include stage 822 of processing only to new, relevant TCP connections. Stage 822 may include at least one of the following: (a) avoiding monitoring when each known session is already associated with the maximal number of TCP connections it may include; (b) Ignoring traffic on TCP connections that were already associated with a session; and (c) Ignoring traffic on TCP connections of unhandled applications (either by known method to classify to application or by marking a TCP connection "irrelevant" if it did not carry a tag for longer than expected by a "relevant" connection.

FIG. 9 illustrates method 900 according to an embodiment of the invention. This method may involve a classifier inspecting upstream HTTP requests.

The methods above rely on some proprietary behavior of either the client or the server and their cooperation with the classifier. This is not always possible and some of the following try to cope with it, relying on some standard properties of the used protocols and transported data.

A multimedia session is a specific user receiving a specific asset. The HTTP requests made for getting the asset or for various parts of it are asking for URIs all belonging to the same asset.

Method 900 may start by stage 910 of monitoring, by the classifier, the HTTP requests on the upstream and mapping the requested URI to the asset. Expected URIs or URI-masks per session are given to the classifier by the sessions manager.

Stage 910 may be followed by stage 920 of combining, by the classifier, the asset identified with the subscriber IP to associate the HTTP request with a specific session.

Now the classifier can associate the TCP-address used with this session and add classification rules by TCP-address.

All traffic on that TCP connection is now classified as belonging to this session.

Note that HTTP request is one of the first packets on a new TCP connection used for HTTP (and any packets before it are very small). This means that all traffic but a negligible part can be classified using this method.

Method 900 may be applicable for many media transfer protocols. Examples include: (a) HTTP download and progressive download where requests are for a single file or byte-ranges in a single file; (b) "HTTP live streaming" (or "Apple Adaptive Streaming") as well as "Adobe dynamic streaming". In both, all requests within the session are for a set of files that all reside under the same path. This path belongs to the asset and has "1-1 onto" mapping to asset; (c) Microsoft SmoothStreaming where requests are for URIs all having the same prefix, being the asset path.

Method 900 may be applicable for a classifier that can monitor upstream.

As for the previous method, a variation is a method where the upstream monitoring logic is performed in another device and in particular in the subscriber gateway, forwarding relevant URLs (or some derived information) and TCP-connection-details to the classifier part including the "fast logic".

FIG. 10 illustrates method 1000 according to an embodiment of the invention.

This method may involve a classifier that monitors pre-inserted asset-ID tags within media payload.

Method 1000 may be applicable when the classifier can only monitor the downstream and one cannot rely on any proprietary behavior of the client or server for the purpose of classification.

Method 1000 may start by stage 1010 of performing a predefined tagging-mechanism by a "content preparation" function when new media content is ingested into the system (online for live streams or by an offline ingest process for pre-recorded assets). This may include inserting an asset identifier (asset-ID).

The tagging may include inserting an asset-ID in the content, using mechanisms offered by the container format.

Example 1: When media content is formatted per MPEG-Transport-Stream, tagging may be embedded as transport_private_data within adaptation field.

Example 2: When container format is ISO based file format (mp4/3GPP), it could be within the metadata box or UUID box.

Example 3: When container format is an ISO-based file format delivered as separate fragments such as with Microsoft SmoothStreaming and Adobe Dynamic Streaming formats: tagging can be embedded inside the boxes sent per fragment (e.g. in a 'uuid' box sent within each 'traf' box).

Some formats and delivery systems (e.g. 3GPP) already embed such asset identifying tags which can be utilized as is requiring no additional preparations.

By using container mechanisms, tagging will remain in the clear even when media is encrypted (e.g. by MPEG-transport-stream encryption or in MSFT specified ISO-based PIFF format). This method is therefore also applicable for encrypted media streams, regardless if tagging is performed before or after encryption.

Stage 1010 may also include saving the same asset-ID in a database and informing the classifier, whenever a session is established for delivering that asset what asset-id to expect in traffic of that session.

In case of an asset being a concatenation of multiple assets, the set of expected asset-ids should be used instead of just one.

Stage 1010 may be followed by stage 1020 of monitoring, by the classifier, unclassified downstream traffic and looking for an asset-ID.

Stage 1020 may be followed by stage 1030, when the classifier identifies an asset-ID tag within unclassified downstream traffic.

Stage 1030 may finding classifying a session based upon the identified asset-ID with source and destination addresses and possibly the time where it was seen and other traffic characteristics. Thus—stage 1030 may include finding a session that matches all of those characteristics. Usage of timing may be needed for cases where same asset-ID may be delivered to multiple applications in the same subscriber network (sharing the same IP address).

The source and destination addresses may be retrieved from a sessions-table accessible to the classifier and may specify for each session the server and client IP addresses, the asset-ID and possibly session start time and additional characteristics.

Stage 1030 may include classifying the TCP connection and all traffic on it as belonging to that session and classifier TCP-based classification rules are updated accordingly.

In systems where same session may span multiple TCP connections (such as some Adaptive-Streaming methods), stage 1010 may include embedding the asset-ID per segment/fragment of the media such that it is bound to appear on all TCP connection carrying the media content so that state 1020 may be applied for each TCP connection used for this session.

Note that the same optimization methods proposed above for monitoring inband tags that were inserted by client/server are also applicable for this method.

FIG. 11 illustrates method 1100 according to an embodiment of the invention.

This method may involve a classifier that monitors HTTP entity tags (etag) fields in media payload.

In systems where asset-ID is mapped to a fixed content (e.g. VoD systems), method 1000 may be simplified by exploiting HTTP etag field used for cache-control, without compromising ability of HTTP-caching.

In this variation system already includes a mechanism that provides a short etag identifying a piece of content.

Method 1100 may start by stage 1110 of calculating, for each ingested asset, an etag of the asset and adding the etag to an assets-database.

Stage 1110 may be followed by stage 1120 of informing the classifier, when a session is created, of an expected etag value of the asset to be delivered by this session. When an asset includes multiple pieces to be retrieved separately by different TCP connections, a set of expected etag values may be used instead of one.

The HTTP server used is one including etag field in HTTP response header.

Stage 1120 may be followed by stage 1130 of monitoring, by the classifier, a first packet of HTTP responses.

Stage 1130 may be followed by stage 1140 of identifying HTTP header format (of the header of the HTTP response) and extracting the etag value.

Stage 1140 may be followed by stage 1150 of associating the TCP connection carrying the HTTP response with a session if the etag value matches an etag value expected in the session.

Figure 12:
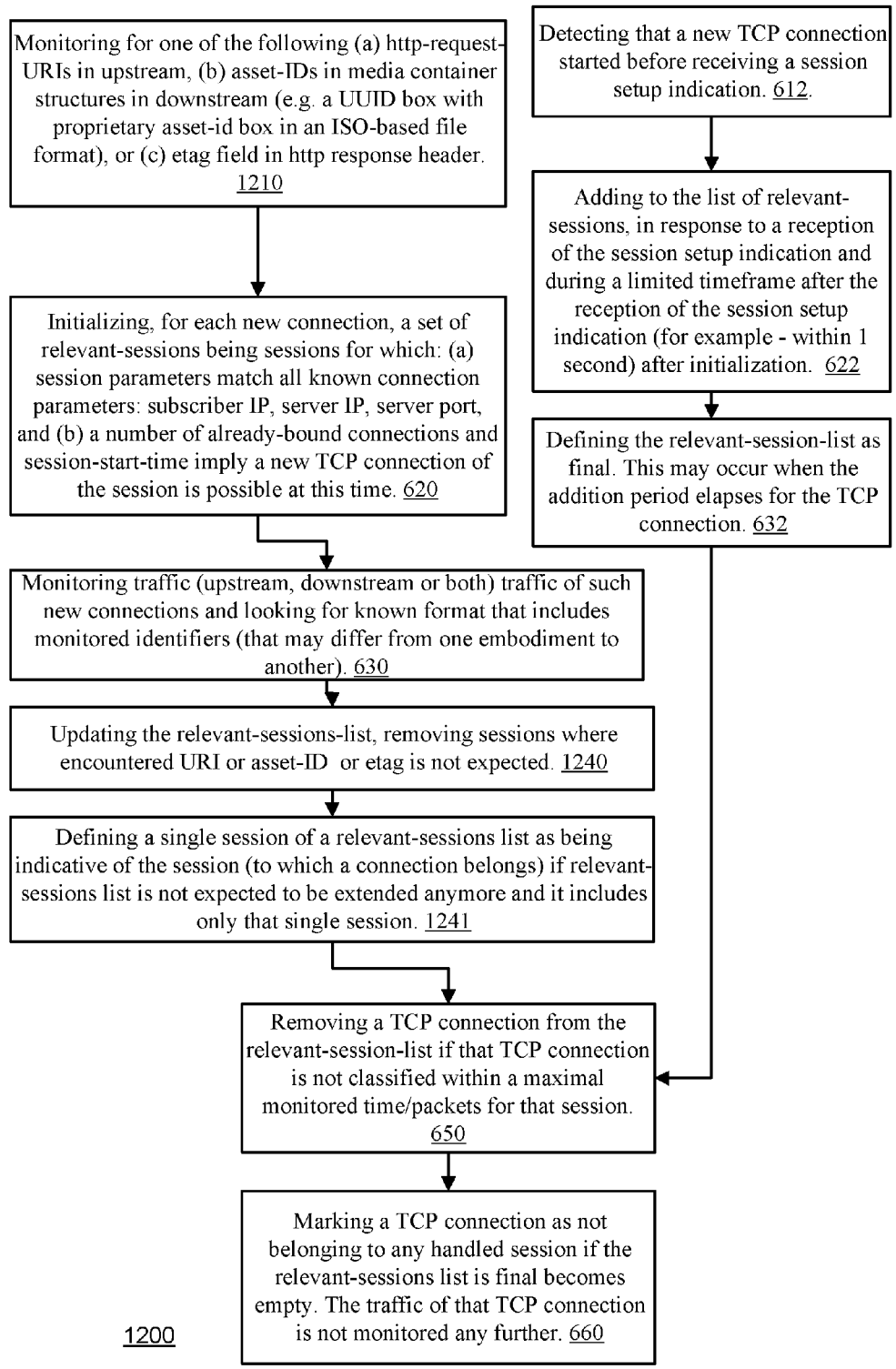
FIG. 12 illustrates a method according to an embodiment of the invention.

Methods 900, 1000 and 1010 may be regarded as examples of method 600 of FIG. 6. FIG. 12 illustrates method 1200 according to an embodiment of the invention. Method 1200 differs from method 600 by the following: (I) Stage 610 is replaced by stage 1210 of monitoring for one of the following (a) HTTP-request-URIs in upstream, (b) asset-IDs in media container structures in downstream (e.g. a UUID box with proprietary asset-id box in an ISO-based file format), or (c) etag field in HTTP response header. (II) Stage 640 is replaced by stage 1240 of updating the relevant-sessions-list, removing sessions where encountered URI or asset-ID or etag is not expected. (III) Stage 641 is replaced by stage 1241 of defining a single session of a relevant-sessions list as being indicative of the session (to which a connection belongs) if relevant-sessions list is not expected to be extended anymore and it includes only that single session.

Stage 1241 may include determining which session is associated with a connection even where a deterministic indication is available—and using a best-matching session that can be chosen by minimizing error probability—and considering a subset of the heuristics suggested in later methods.

Figure 13:
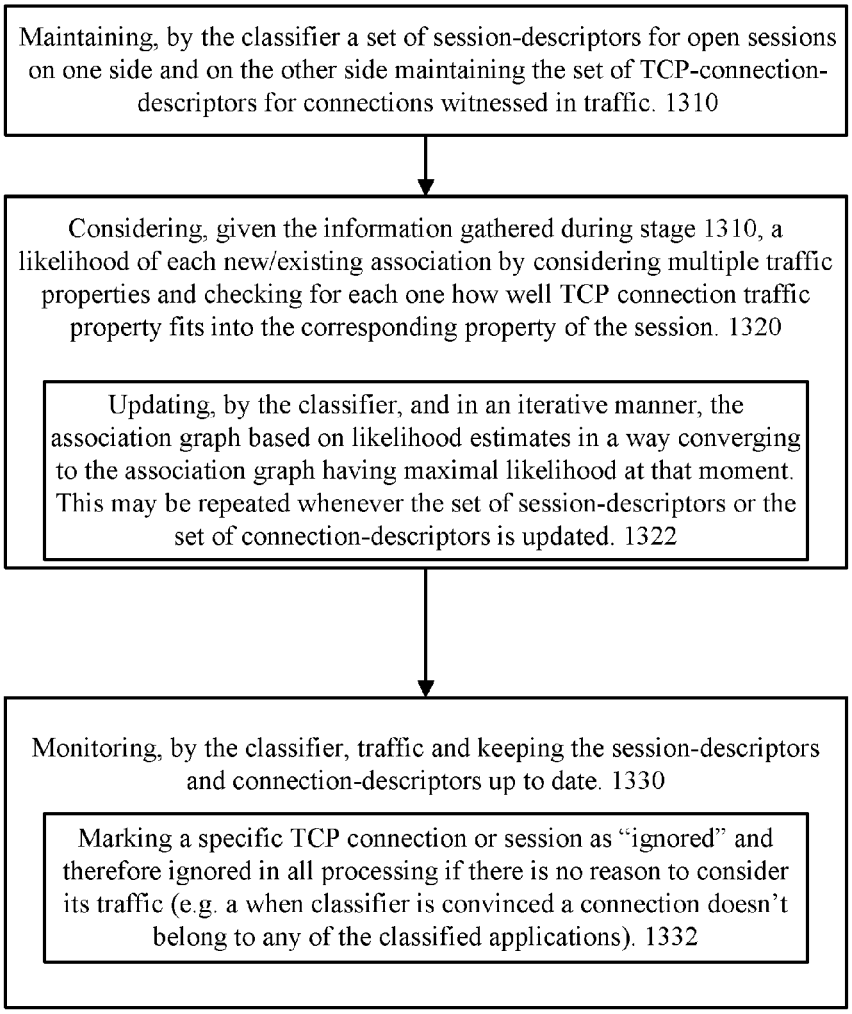
FIG. 13 illustrates a method according to an embodiment of the invention.

FIG. 13 illustrates method 1300 according to an embodiment of the invention. This method may be regarded as a heuristic method and may involve the classifier inspecting properties of common encrypted media formats.

This method is applicable when classifier can only monitor the downstream traffic and cannot rely on any proprietary behavior of the client or server for the purpose of classification or on any asset-ID tags within the media payload.

Method 1300 starts by stage 1310 of maintaining, by the classifier a set of session-descriptors for open sessions on one side and on the other side maintaining the set of TCP-connection-descriptors for connections witnessed in traffic. Stage 1310 may also include keeping track, by the classifier, of already-decided associations of TCP connections to sessions. This may be a bipartite graph with session-nodes on one side and TCP connections on the other and 1 to n allowed-relation between sessions and connections respectively.

Stage 1310 may be followed by stage 1320 of considering, given the information gathered during stage 1320, a likelihood of each new/existing association by considering multiple traffic properties and checking for each one how well TCP connection traffic property fits into the corresponding property of the session.

Stage 1320 may include stage 1322 of updating, by the classifier, and in an iterative manner, the association graph based on likelihood estimates in a way converging to the association graph having maximal likelihood at that moment. This may be repeated whenever the set of session-descriptors or the set of connection-descriptors is updated.

For sake of discussion we consider a model where classifier checks all possible association graphs and calculates overall likelihood per graph picking the best one.

It is noted that a partial check may be applied. Known methods used in machine-learning and/or coding allow iteratively calculating the likelihood of a small number of possible changes such that graph converges to something having high probability to be close enough to most likely graph. Such iterative methods are expected to be efficient for our problem since the set of sessions and the set of TCP connections is expected to change relatively slowly.

When calculating the likelihood of a specific candidate association given a set of existing ones, the classifier shall calculate likelihood-indication by each of a set of tests listed below and calculate the aggregated likelihood for that association.

A simple example is one where aggregated likelihood (probability) is the product of all probabilities of individual test. Some tests may not be informative for a specific association and shall result in "don't care" value not affecting aggregated likelihood.

When a subset of tests already indicates very-high likelihood, rest of the tests can be skipped in case it is already clear that the association will be adopted with high probability. Same applies when encountering very low likelihood such that association would be rejected with high probability.

Tests should therefore be calculated in an order optimizing expected amount of processing before aggregated likelihood is decided for the association.

To allow the calculation of each likelihood test on each possible association, the classifier shall maintain: (A) A set of session-descriptors including for each active session, the set of session parameters to be used in tests. Parameters can include things like setup-time, type of media tracks/elementary streams, bit-rate, resolution etc. Some of the session parameters are deterministically known and are fixed based on externally provided session parameters. Some of the session parameters are derived from traffic that was already associated with the session and are dynamic (may be updated). (B) A set of TCP-connection descriptors, including for each witnessed, active TCP connection a set of connection parameters to be used in tests. Connection parameters are derived from traffic. Some connection parameters (e.g. IP addresses) are considered fixed for the system while others are considered dynamic (may be updated). And (C) The set of currently decided associations.

Method 1300 may also include stage 1330 of monitoring, by the classifier, traffic and keeping the session-descriptors and connection-descriptors up to date. Stage 1330 may include stage 1332 of marking a specific TCP connection or session as "ignored" and therefore ignored in all processing if there is no reason to consider its traffic (e.g. a when classifier is convinced a connection doesn't belong to any of the classified applications).

When executing stage 1320 the classifier may use some or all of the following tests for considering likelihood of an association—creating time test, number of connections, connection setup time matches termination-time of another connection, addresses and protocols test, bandwidth test, inspecting that HTTP/container fields match application and asset of the session, testing regularity of the media unit timestamps, or processing other indications of time in the traffic.

Creation time test—this test is applicable for evaluating new associations for newly created sessions of applications expected to set up TCP connections within a given interval around session creation time. This test calculates likelihood that application set up a TCP connection with the connection setup-time given the session creation time (e.g. 1 if it matches interval and 0 otherwise).

Number of connections—when a session is known or expected to have N-M concurrent TCP connections, and already has maximal amount of associated connections, low likelihood is given to new associations with this session.

When number of expected TCP connections is not known a-priori, classifier can learn it from the session history.

Connection setup time matches termination-time of another connection—for some applications session typically includes a fixed number of concurrent TCP connections and occasionally one connection is closed and another is immediately opened (e.g. in Apple Adaptive Streaming). For sessions of such applications, classifier notes closing time of connections that were associated and closed and this test checks if new connection setup time matches relevant interval around it, indicating high likelihood if it does and low if it doesn't).

Addresses and protocols test—a session is typically known to be between given network layer parameters (e.g. server IP, server port, subscriber IP, using TCP, certain QoS tags used for that application). Associations of the session with connections not matching such known parameters are considered invalid.

Bandwidth test—this is relevant when session is expected to have a certain bandwidth (BW) or BW range for the session and/or per connection (BW for this purpose can defined either as total size of media content requested by client per time period or as total size of media content to be presented per time period). The classifier can measure the actual BW of already associated traffic and BW of traffic per connection. An overall set of associations for the session will have low probability if it is outside the expected range.

This test also indicated high/low probability for an association if it matches/contradicts per-connection expected BW and high probability for new association that will bring overall BW into expected range.

This is also applicable wither when session BW range is known or when classifier learns session BW properties from past session traffic.

Inspecting that HTTP/container fields match application and asset of the session—this test checks some or all of the following, indicating association is invalid if some checks failed and valid otherwise:

a. Check that first packet of HTTP response includes HTTP header,
b. Check that header fields in HTTP header match to session and asset properties, in particular media-type, modification-date and etag HTTP header fields are typically included by HTTP servers and should match known application and asset properties,
c. Check for existence of media container structures expected in first packet(s) of HTTP response payload. This may include, for example:
   i. PAT, PMT packets, PCR fields expected neat start of for MPEG transport stream or of Apple Adaptive Stream segments;
   ii. ISO defined 'moov'/'mfhd'/'trak' boxes appearing in first part of ISO-based file formats;
   iii. ISO defined 'moof'/'mfhd'/'traf' boxes appearing in first part of each fragment for fragmented ISO-based formats;
d. Check that asset-properties indicated by identified container structures match application and asset of session and are consistent with values found in traffic that was already associated with the session with high probability. For example:
   i. Test that PAT and PMT tables of a transport stream match number and types of streams expected,
   ii. Test that track boxes in ISO-based formats match number and types. The classifier can also learn these parameters traffic already associated with the session (e.g. PMT is expected to be similar or same as previous copies, Each fragment of a fragmented, ISO-based file is expected to have same set of tracks).
   iii. Test additional media parameters (e.g. video resolution or audio sampling rate) if specified in the unencrypted container structures (such as in ISO-based file formats),
   iv. When DRM structures indicate (e.g. CA descriptor for transport-stream or Sample encryption box in MSFT SmoothStreaming media) indicate a key-identifier that corresponds to an asset/large part of an asset/set of assets, it should be compared to known key-identifier(s) for the session or to previously encountered key-id and a likelihood indication can be derived.

Test regularity of that media unit timestamps—media sessions are expected to convey, per media track (e.g. video) a series of media units whose presentation/composition/decoding times form an equally-spaced-grid (except when user performs random access which is expected happen just a few times per session). Presentation/composition/decoding times of media units in payload can usually be derived from traffic even when media content is encrypted (e.g. 'PTS' values in MPEG PES headers, 'stts'/'ctts').

This test may indicate high likelihood of a set of multiple associations for a session if all included media-units for a regular time grid for each track/elementary stream. Indicate low likelihood otherwise.

This test may indicate high likelihood for a new association if it brings the current situation closer to a regular grid or low-likelihood if it brings a current situation farther from a regular grid.

Note that timestamps grid regularity can be inspected even when presentation intervals are not known to the classifier a-priori. Classifier can also learn these intervals from past traffic.

Processing other indications of time in the traffic—this test can be used when media-unit presentation times cannot be derived from traffic but a different indication of time (on a continuous timeline) exists in the traffic. Continuity and regularity rules of such time indications (e.g. for transport stream, PCR values have strict rules for how they should advance along the stream) can be used assess likelihood of an association. For example, when the TCP connection is closed and a new candidate TCP connection is considered to be its replacement, association has high likelihood if first PCR value on new connection is perfectly continuing the timeline in traffic that stopped and it has lower likelihood if PCR values in it are hours away from recent traffic of this session.

This method is also based on the general monitoring flow in FIG. 6, where step 630 of the flow would maintain the association-graph between sessions and connections as described above. In this case step 630 often ends with non-deterministic association. It iteratively updates previous decisions, issuing updates to classification rules accordingly.

Note that in systems where cost/benefit is asymmetric, namely penalty of including wrong association is higher/lower than penalty of missing true associations, criteria for including an association should be modified to use maximal expected benefit (or minimal expected cost) instead of maximal likelihood.

Figure 14:
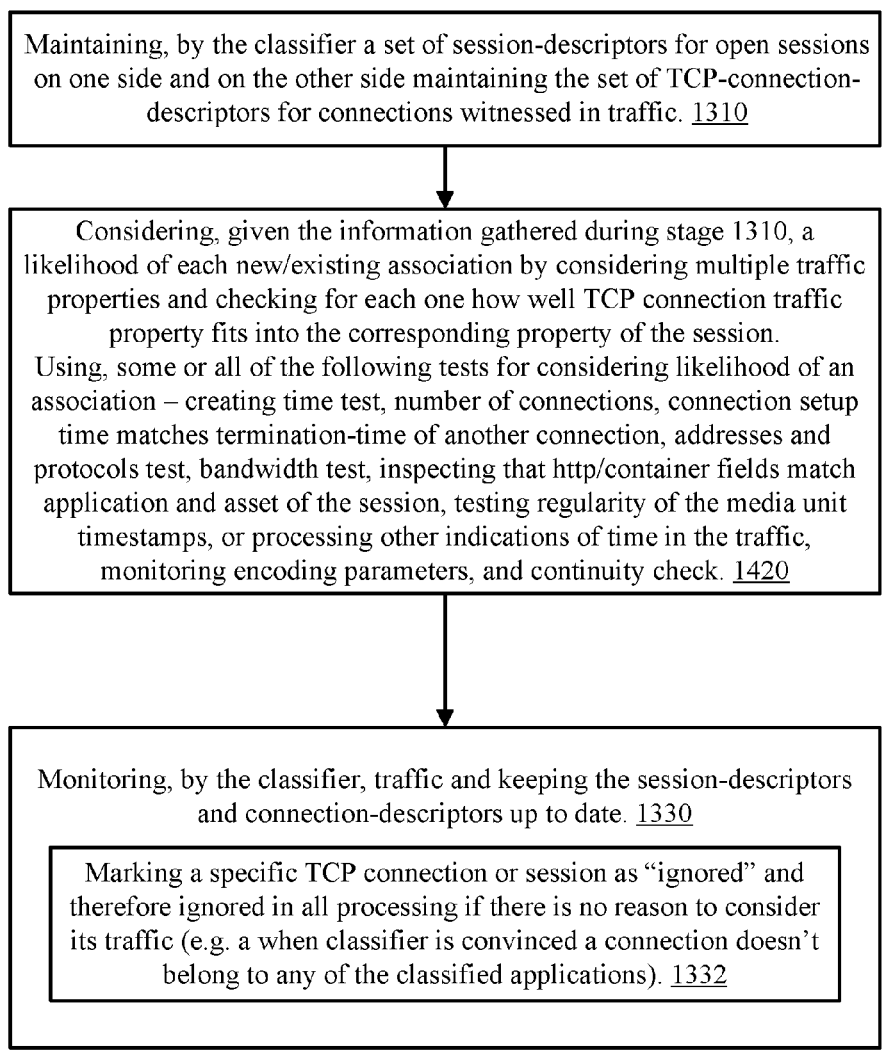
FIG. 14 illustrates a method according to an embodiment of the invention.

FIG. 14 illustrates method 1400 according to an embodiment of the invention. This method may be regarded as a heuristic method and may involve the classifier as inspecting clear downstream traffic.

Method 1400 is applicable when the classifier can only monitor the downstream and one cannot rely on any proprietary behavior of the client or server for the purpose of classification or on any asset-ID tags within the media payload. It also assumes that the traffic is in the clear.

Method 1400 may resemble method 1300 but stage 1320 may be replaced by stage 1420 that includes more tests that can be applied.

Thus, stage 1420 may include using, some or all of the following tests for considering likelihood of an association—creating time test, number of connections, connection setup time matches termination-time of another connection, addresses and protocols test, bandwidth test, inspecting that HTTP/container fields match application and asset of the session, testing regularity of the media unit timestamps, or processing other indications of time in the traffic, monitoring encoding parameters, and continuity check.

Monitoring encoding parameters—monitoring encoding parameters of a media stream that are expected to remain the same throughout the session. As such, classifier shall monitor such encoding parameters coded inside the media stream payload and test if values in traffic match expectation for the application and asset of the session and are consistent with values previously seen on this session. Examples for such parameters include sampling rate, resolution, refresh-rate, color-coding, usage of optional encoding features, etc.).

Continuity check—continuity is also expected most of the time in media content. For example in a video stream pictures being part of the same scene are mostly similar; same instruments are typically used throughout a musical piece. The classifier can perform signal-processing tests to identify similarity of media content between candidate-traffic and session-traffic and consider it when estimating likelihood of the association.

Any of the methods mentioned above can be executed by a computer that executed instructions stored in a non-transitory computer readable medium of a computer program product. The computer readable medium can be a diskette, a tape, a disk, a memory chip, a compact disk and the like. It can be read by using electro-magnetic manners, electrical signals, light beams, magnetic fields and the like. Any combination of any methods (or any stages or any method) can be provided. One or more non-transitory computer readable mediums can store instructions for any combination of any stage or any method (or of any method).

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more"

or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for session based classification, the method comprising:
   detecting an initialization of a certain transmission communication protocol (TCP) connection;
   maintaining a connection table comprising one or more TCP connection descriptors for TCP connections detected in traffic;
   maintaining, by a classifier, a set of session descriptors for open sessions;
   defining the certain TCP connection as an active TCP connection in the connection table;
   receiving, by the classifier, an incoming packet that belongs to a session for transfer of a media asset that comprises at least one of audio content and video content, the transfer comprising conveying the media asset using a HyperText Transfer Protocol (HTTP) as an application layer protocol;
   determining, by the classifier, whether the incoming packet belongs to the certain active TCP connection based upon its presence in the connection table;
   generating and iteratively updating, by the classifier, a plurality of mappings wherein each mapping is between a session and an active TCP connection in the connection table, the plurality of mappings comprising data for maintaining an association graph, wherein the updating of the plurality of mappings is based upon calculating estimations of likelihood of an association corresponding to a respective mapping, the calculating comprising considering a plurality of traffic properties for each TCP connection and checking for each of the traffic properties how well the traffic property matches a corresponding property of each session;
   if it is determined that the incoming packet belongs to the certain active TCP connection then classifying the incoming packet to a session that is associated with the certain active TCP connection based upon the mapping between sessions and active TCP connections maintained by the connection table; and
   processing the incoming packet using a first logic for performing work per packet, the first logic comprising matching the incoming packet to a corresponding session included in a corresponding mapping of the plurality of mappings, wherein the matching of the incoming packet is based upon the active TCP connection of the corresponding mapping;
   wherein the step of iteratively updating comprises:
      processing an incoming notification message, the incoming notification message indicative of an initiation or a termination of a TCP connection, using a second logic for performing work per TCP connection being initiated or terminated, the second logic comprising performing an iteration of the updating step.

2. The method according to claim 1, comprising determining, by the classifier, whether the incoming packet belongs to the certain active TCP connection, to another active TCP connection, or not to any active TCP connection;
   if it is determined that the incoming packet belongs to the certain active TCP connection then classifying the incoming packet to a session that is associated with the certain active TCP connection based upon the plurality of mappings between sessions and active TCP connections; and
   if it is determined that the incoming packet belongs to the other active TCP connection then classifying the incoming packet to another session that is associated with the other active TCP connection, based upon the plurality of mappings between sessions and active TCP connections.

3. The method according to claim 2, wherein if it is determined that the incoming packet does not belong to any active TCP connection then delaying a classification of the incoming packet.

4. The method according to claim 3, wherein if it is determined that the incoming packet does not belong to any active TCP connection then tagging the incoming packet as belonging to an unclassified session.

5. The method according to claim 1, comprising estimating a mapping between the certain TCP connection and a certain session, if the plurality of mappings lacks a fully resolved mapping between the certain TCP connection and any session.

6. The method according to claim 1, comprising maintaining by a first circuit of the classifier a data structure indicative of active TCP connections and performing the classifying by a second circuit of the classifier.

7. The method according to claim 1, comprising generating the plurality of mappings between sessions and active TCP connections in response to HTTP attributes of an incoming packet and information about a user that is either a destination of the incoming packet or a source of the incoming packet.

8. The method according to claim 1, comprising detecting an initialization of a certain TCP connection only in one direction out of upstream and downstream.

9. A method for session based classification, the method comprising:
   maintaining a connection table comprising one or more TCP connection descriptors for TCP connections detected in traffic;
   maintaining, by a classifier, a set of session descriptors for open sessions;
   receiving, by the classifier, a session identification message that is indicative of a certain session for transfer of a media asset that comprises at least one of audio content and video content, the certain session comprising conveying the media asset over a certain transmission communication protocol (TCP) connection, using a protocol family that comprises Internet Protocol (IP), TCP and HyperText Transfer Protocol (HTTP); and
   associating each incoming packet that is conveyed over the certain TCP connection as belonging to the certain session by including the incoming packet in a connection table;
   generating and iteratively updating, by the classifier, a plurality of mappings wherein each mapping is between a session and an active TCP connection in the connection table, the plurality of mappings comprising data for maintaining an association graph, wherein the updating of the plurality of mappings is based upon calculating estimations of likelihood of an association corresponding to a respective mapping, the calculating comprising considering a plurality of traffic properties for each TCP connection and checking for each of the traffic properties how well the traffic property matches a corresponding property of each session; and processing each incoming packet associated with the certain session using a first logic for performing work per packet, the first logic comprising matching the incoming packet to a corresponding session included in a corresponding mapping of the plurality of mappings, wherein the matching of the incoming packet is based upon the active TCP connection of the corresponding mapping;

wherein the step of iteratively updating comprises:
  processing an incoming notification message, the incoming notification message indicative of an initiation or a termination of a TCP connection, using a second logic for performing work per TCP connection being initiated or terminated, the second logic comprising performing an iteration of the updating step.

10. The method according to claim 9, wherein the session identification message is generated by a user that is either a destination of the incoming packet or a source of the incoming packet.

11. The method according to claim 9, wherein the session identification message is generated by a content preparation device that is coupled to an HTTP server that is either a destination of the incoming packet or a source of the incoming packet.

12. The method according to claim 9, wherein the session identification message is embedded in a HTTP entity tag.

13. A non-transitory computer readable medium that stores instructions for:
  detecting an initialization of a certain transmission communication protocol (TCP) connection;
  maintaining a connection table comprising one or more TCP connection descriptors for TCP connections detected in traffic;
  maintaining, by a classifier, a set of session descriptors for open sessions;
  defining the certain TCP connection as an active TCP connection in the connection table;
  receiving, by the classifier, an incoming packet that belongs to a session for transfer of a media asset that comprises at least one of audio content and video content, the session comprising conveying the media asset using a HyperText Transfer Protocol (HTTP) as an application layer protocol;
  generating and iteratively updating, by the classifier, a plurality of mappings wherein each mapping is between a session and an active TCP connection in the connection table, the plurality of mappings comprising data for maintaining an association graph, wherein the updating of the plurality of mappings is based upon calculating estimations of likelihood of an association corresponding to a respective mapping, the calculating comprising considering a plurality of traffic properties for each TCP connection and checking for each of the traffic properties how well the traffic property matches a corresponding property of each session;
  determining whether the incoming packet belongs to the certain active TCP connection based upon its inclusion in the connection table;
  if it is determined that the incoming packet belongs to the certain active TCP connection then classifying the incoming packet to a session that is associated with the certain active TCP connection based upon the mapping between sessions and active TCP connections maintained by the connection table; and
  processing the incoming packet using a first logic for performing work per packet, the first logic comprising matching the incoming packet to a corresponding session included in a corresponding mapping of the plurality of mappings, wherein the matching of the incoming packet is based upon the active TCP connection of the corresponding mapping;
  wherein the instructions for iteratively updating comprise instructions for:
    processing an incoming notification message, the incoming notification message indicative of an initiation or a termination of a TCP connection, using a second logic for performing work per TCP connection being initiated or terminated, the second logic comprising performing an iteration of the updating.

14. The non-transitory computer readable medium according to claim 13, storing instructions for determining whether the incoming packet belongs to the certain active TCP connection, to another active TCP connection or not to any active TCP connection;
  if it is determined that the incoming packet belongs to the certain active TCP connection then classifying the incoming packet to a session that is associated with the certain active TCP connection based upon the plurality of mappings between sessions and active TCP connections; and
  if it is determined that the incoming packet belongs to the other active TCP connection then classifying the incoming packet to another session that is associated with the other active TCP connection, based upon the plurality of mappings between sessions and active TCP connections.

15. The non-transitory computer readable medium according to claim 14, storing instructions for delaying a classification of the incoming packet if it is determined that the incoming packet does not belong to any active TCP connection.

16. The non-transitory computer readable medium according to claim 13, storing instructions for estimating a mapping between the certain TCP connection and a certain session, if the plurality of mappings lacks a fully resolved mapping between the certain TCP connection and any session.

17. A non-transitory computer readable medium that stores instructions for:
  maintaining a connection table comprising one or more TCP connection descriptors for TCP connections detected in traffic;
  maintaining, by a classifier, a set of session descriptors for open sessions;
  receiving a session identification message that is indicative of a certain session for transfer of a media asset that comprises at least one of audio content and video content, the certain session comprising conveying the media asset over a certain transmission communication protocol (TCP) connection, using a protocol family that comprises Internet Protocol (IP), TCP and HyperText Transfer Protocol (HTTP);

generating and iteratively updating, by the classifier, a plurality of mappings wherein each mapping is between a session and an active TCP connection in the connection table, the plurality of mappings comprising data for maintaining an association graph, wherein the updating of the plurality of mappings is based upon calculating estimations of likelihood of an association corresponding to a respective mapping, the calculating comprising considering a plurality of traffic properties for each TCP connection and checking for each of the traffic properties how well the traffic property matches a corresponding property of each session;

associating each incoming packet that is conveyed over the certain TCP connection as belonging to the certain session; and processing each incoming packet associated with the certain session using a first logic for performing work per packet, the first logic comprising matching the incoming packet to a corresponding session included in a corresponding mapping of the plurality of mappings, wherein the matching of the incoming packet is based upon the active TCP connection of the corresponding mapping;

wherein the instructions for iteratively updating comprise instructions for:

processing an incoming notification message, the incoming notification message indicative of an initiation or a termination of a TCP connection, using a second logic for performing work per TCP connection being initiated or terminated, the second logic comprising performing an iteration of the updating.

* * * * *